United States Patent [19]

Barnes et al.

[11] Patent Number: 4,775,824

[45] Date of Patent: Oct. 4, 1988

[54] MOTOR CONTROL FOR BANKNOTE HANDING APPARATUS

[75] Inventors: Elwood E. Barnes, Parkesburg; Bob M. Dobbins, Villanova, both of Pa.; Thomas E. Shuren, Stanhope, N.J.; John Zouzoulas, West Chester, Pa.

[73] Assignee: Mars, Incorporated, McLean, Va.

[21] Appl. No.: 89,509

[22] Filed: Aug. 26, 1987

Related U.S. Application Data

[63] Continuation-in-part of Ser. No. 916,388, Oct. 8, 1986, abandoned.

[51] Int. Cl.[4] .............................................. H02P 3/08

[52] U.S. Cl. .................................... 318/567; 318/369

[58] Field of Search ............... 318/362, 364, 365, 366, 318/369, 466, 467, 468, 560, 567; 270/58, 59; 271/187, 314, 315; 194/216, 217; 209/534, 548

[56] References Cited

U.S. PATENT DOCUMENTS

| | | | |
|---|---|---|---|
| 4,260,148 | 4/1981 | Diesch et al. | 271/314 X |
| 4,329,631 | 5/1982 | Betsch et al. | 318/444 X |
| 4,401,929 | 8/1983 | Odaka et al. | 318/466 |
| 4,422,024 | 12/1983 | Itoh et al. | 318/443 |
| 4,682,768 | 7/1987 | Iida et al. | 209/534 X |

FOREIGN PATENT DOCUMENTS

| | | | |
|---|---|---|---|
| 2158869 | 5/1973 | France . | |
| 8300136 | 1/1983 | PCT Int'l Appl. | 271/315 |
| 2128351 | 4/1984 | United Kingdom . | |
| 2130397 | 5/1984 | United Kingdom . | |

OTHER PUBLICATIONS

IBM Technical Disclosure Bulletin, J. W. Boone et al., "Photomaterial for the Fabrication of Printed Circuits", vol. 12, No. 12, May 1970, p. 2159.

IBM Technical Disclosure Bulletin, B. C. Atwood, "High Resolution Photomask", vol. 13, No. 7, Dec. 1970, p. 2078.

IBM Technical Disclosure Bulletin, D. G. Van Oppens, "Dry-Peel Photo Emulsion Stripping", vol. 12, No. 11, Apr. 1970, pp. 1777–1778.

Patent Abstracts of Japan, vol. 4, No. 86, Jun. 20, 1980, p. 136P16 (p-16) (568) & JP, A, 5550246 (Fuji Shashin Film K.K.) Apr. 11, 1980.

*Primary Examiner*—Bentsu Ro

*Attorney, Agent, or Firm*—Davis, Hoxie, Faithfull and Hapgood

[57] ABSTRACT

An improved motor cntrol for banknote handling apparatus is described. An improved stacker pusher motor arrangement has a defined cycle of operation. The time it takes the stacker pusher motor to complete a predetermined portion of this cycle is measured. A braking time is computed from the measured time, and a braking control signal dependent thereon is applied to the stacker pusher motor to stop the stacker pusher motor at the appropriate position. An improved banknote transporting arrangement measures the time needed for a banknote to travel from a first point to a second point. A braking time is computed from the measured time and an appropriate braking control signal is applied to stop the banknote at the appropriate position.

17 Claims, 11 Drawing Sheets

MOTOR CONTROL FOR BANKNOTE HANDING APPARATUS

CROSS-REFERENCE TO RELATED APPLICATION

The present application is a continuation-in-part of U.S. application Ser. No. 916,338 filed Oct. 8, 1986, now abandoned.

FILD OF THE INVENTION

The present invention relates to an improved banknote handling apparatus, and particularly to an improved method and apparatus for motor control therein.

BACKGROUND OF THE INVENTION

A number of banknote handling apparatuses, such as banknote validators, stackers for use in conjunction with banknote validators and combined validator and stacker units are presently known including the validator described in U.S. Pat. No. 4,628,194 issued on Dec. 9, 1986 and the stackers described in U.S. application Ser. Nos. 709,559 and 904,714 filed on Mar. 8, 1985 and Sept. 5, 1986 respectively. Each of the above identified applications is assigned to the assignee of the present application. In the banknote stackers, a fixed braking time is used to insure that the stacker pusher motor is properly stopped in its home position. Also, the final location of a banknote to be stacked is determined by driving the banknote transporting apparatus and consequently the banknote a fixed time from its exit from the validator portion of the banknote handling apparatus, and allowing the banknote to coast to a stop. Alternatively, a fixed brake time might have been used to stop the banknote just as a fixed brake time was applied to stop the pusher motor. During the fixed brake time for the pusher motor, a reverse drive signal is applied in order to bring the pusher motor to a stop. With the application of a fixed brake time, variations in the final stop position may occur. Similarly, if a fixed brake time is applied to the banknote transporting apparatus, variations in the final stop position of the banknote may occur, depending on banknote speed. For example, if the banknote is traveling too rapidly, a fixed braking time will not be sufficient and the banknote will overshoot its intended stop position. If the banknote is traveling too slowly, a fixed braking time will be too long and the braking operation will result in the banknote being driven backwards so that it is stopped at a position before the correct stop position, thereby undershooting the proper stop position.

Such speed variations can occur as a result of the differences between crisp, new banknotes and worn, old banknotes, component aging, product environmental changes, and the like. Additionally, as the beginning of the drive time is based on the release of a jam sensor or other mechanical switch, the variations in the response time of the mechanical switch affects the final position of the bill.

Other schemes have been used to determine the position of a banknote in a stacker housing. These schemes include using actual feedback from drive motor arrangement employing a decoder circuit to determine the actual distance the banknote has been driven based upon a calculation of the number of rotations of the drive motor. This arrangement accounts for speed variations of the drive motor, but not for slippage of the banknote. Additionally, the problems recited above associated with applying fixed brake times are also present for this arrangement. More complicated arrangements employing a number of position sensing switches are also known.

SUMMARY OF THE INVENTION

The braking time necessary to be applied to stop a motor assembly is linearly proportional to the moment of inertia and speed of the motor assembly. More specifically, the braking time can be calculated using the formula: $t=(wr^2N)/(308T)$, where t is the braking time in seconds, N is the speed of the motor assembly in rotations per minute (RPM) before braking, T is the torque applied during braking, and $wr^2$ is the moment of inertia of the motor assembly.

Consequently, rather than using a fixed braking time to control a banknote positioning means such as a stacker pusher motor or a banknote transporting means, a braking time can be computed. The use of a computed braking time adds greater flexibility. It allows a different speed motor assembly having the same moment of inertia to be used, and allows for speed variations such as those due to variations in the supply voltage, variations in the load, variations due to time such as aging, temperature variations and the like.

According to one aspect of the present invention, the speed of a stacker pusher motor assembly is determined by measuring the time it takes to travel a fixed distance such as a revolution or a fixed portion of a revolution. From this speed measurement, a braking time is derived, and a braking signal is applied based on this braking time. Preferably, the braking time is recalculated every time the pusher motor is operated.

In a further aspect of the invention, a computed braking time is used to control the braking of a banknote transporting assembly. More specifically, according to the present invention, a sensing device is used to determine when a banknote is properly located for stacking. A braking time that is linearly proportional to the moment of inertia of the banknote transporting assembly which transports the banknote to the proper position and the measured speed of the banknote during transport is employed to stop the banknote in the proper position.

In one embodiment of the present invention, the time it takes the banknote to travel a fixed distance from the jam sensor release point to a sensor which detects that the banknote is ready to be stacked is measured. In a preferred embodiment the banknote will be stopped if a second banknote is inserted while the banknote is traveling from the jam sensor release point to the ready to be stacked sensor. If this occurs, the time it takes the banknote to travel from its last stop point to the ready to be stacked sensor is measured. The time measured is dependent on the speed of travel of the banknote. An appropriate braking time is derived, and a suitable braking signal is applied based on this derived braking time. The braking time is recalculated for every banknote.

For the present invention, where the possibility of replacement of one motor assembly with another is discussed, it is assumed that the moment of inertia for a given motor assembly and any other motor assembly which may be interchanged with the given motor assembly is the same.

DETAILED DESCRIPTION

The present application describes several embodiments of improved banknote handling apparatus according to the present invention. These embodiments describe method and apparatus for stopping a banknote positioning means at the appropriate position by applying a braking force for a computed time. In general, the time it takes a banknote positioning means to complete a predetermined portion of a cycle of operation is measured. Then, a braking time is computed. Finally, a braking force is applied for the computed braking time.

In one embodiment, control of a stacker pusher motor is described. In another embodiment, control of a banknote transporting means such as a motor driven belt and pulley arrangement is described. It should be recognized that the present invention also applies to other aspects of banknote positioning in banknote handling apparatus for determining validity of banknotes and storing banknotes. First, as background, the overall operation of banknote handling apparatus will be described.

Figure 1:
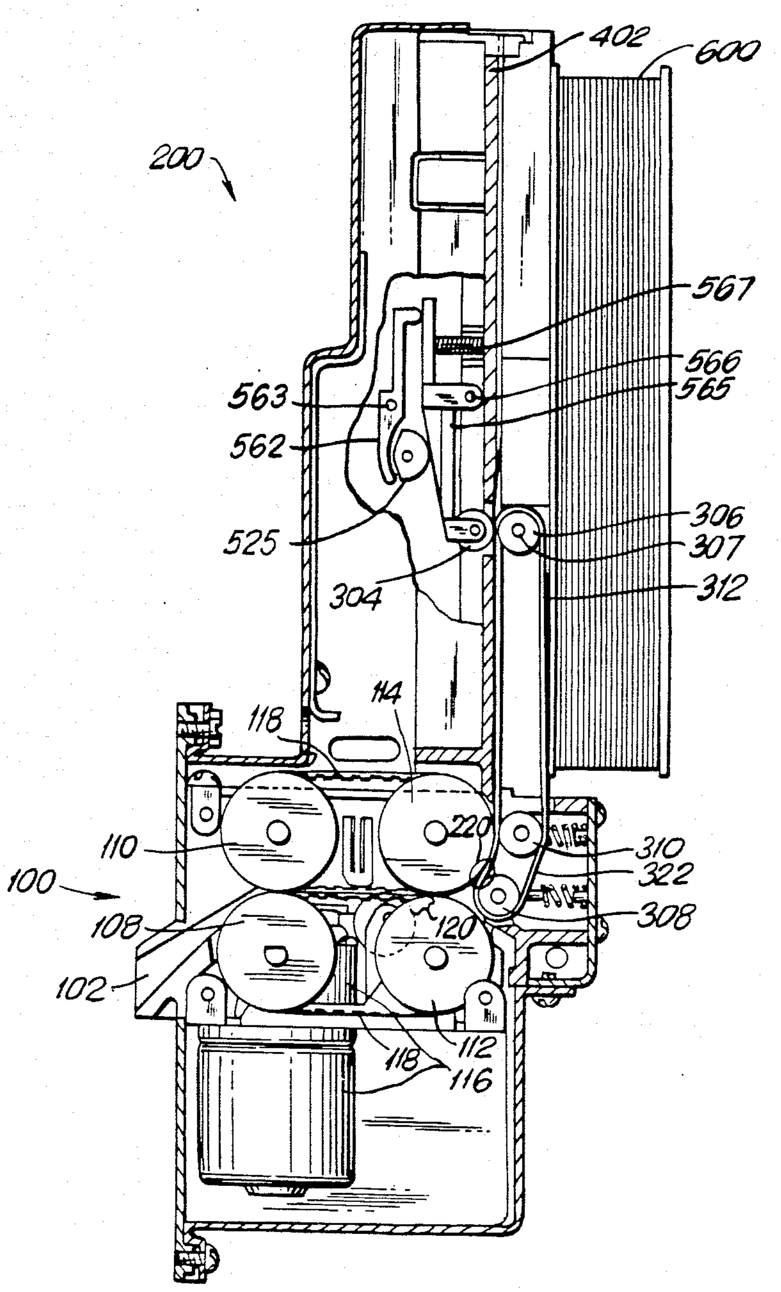
FIG. 1 is a side view of one embodiment of a banknote handling apparatus according to the present invention comprising a stacker which is connected to a banknote validator.

One embodiment of improved banknote handling apparatus 10 according to the present invention is shown in FIG. 1. In FIG. 1, a stacker 200 is shown connected to a banknote validator 100 to form the banknote handling apparatus 10. The stacker 200 incorporates several major component groups including a banknote transport means 300, a prestorage compartment 400 (shown in FIG. 2), a pusher means 500 shown in FIGS. 2–5), and a banknote magazine 600 (shown in FIG. 2).

The details of the validator 100 pertaining to banknote validation are not part of this invention. As a result, those aspects of the validator are not discussed further below. Further, various aspects of the electrical and mechanical connection of the validator 100 and the stacker 200 do not form a part of this invention and they also are not further described below.

The validator 100 shown in FIG. 1 is preferably a commercially available unit sold by Mars Electronics, West Chester, Pa., U.S.A. The Mars Electronics validator operates generally as described in U.S. patent application Ser. No. 659,411 filed Oct. 10, 1984 and assigned to the assignee of the present application, the disclosure of which is incorporated by reference herein.

Briefly, validator 100 determines whether inserted banknotes are acceptable. Banknotes are inserted lead edge first one at a time into validator 100 at a banknote entrance 102. In the entrance 102, the banknote is sensed by a start sensor 104 which as shown in FIG. 1 comprises an optical transmitter and receiver arranged so that an inserted banknote will interrupt the passage of light between the two. From entrance 102, a banknote is transported lengthwise through the validator to the validator's banknote output by a series of pairs of pulleys or rollers 108, 110, 112 and 114 and two pairs of belts 118 which grip the side edges of the banknote and which are driven by a drive means 116 including a motor and drive train.

While the banknote is transported through the validator 100, it is tested by a group of sensors to ascertain its validity and denomination. Output signals from the sensors are processed by logic circuits, including a microprocessor 150 (shown in FIG. 7) in validator 100 to determine whether the banknote is acceptable. A banknote which is found unacceptable is ejected back through entrance 102 by reversing the drive means 116. To avoid a duplication of electronic control circuitry, the microprocessor 150 of the validator 100 is also preferably used to control the operation of the stacker 200; however, it should be recognized that stacker 200 may include its own electronic control circuit such as a microprocessor, memory, and the like for controlling its operation.

An acceptable banknote is driven by the pairs of belts 11B and the pairs of rollers 112 and 114 into an interconnection region 120 in which the validator 100 and the stacker 200 are connected together.

Figure 10:
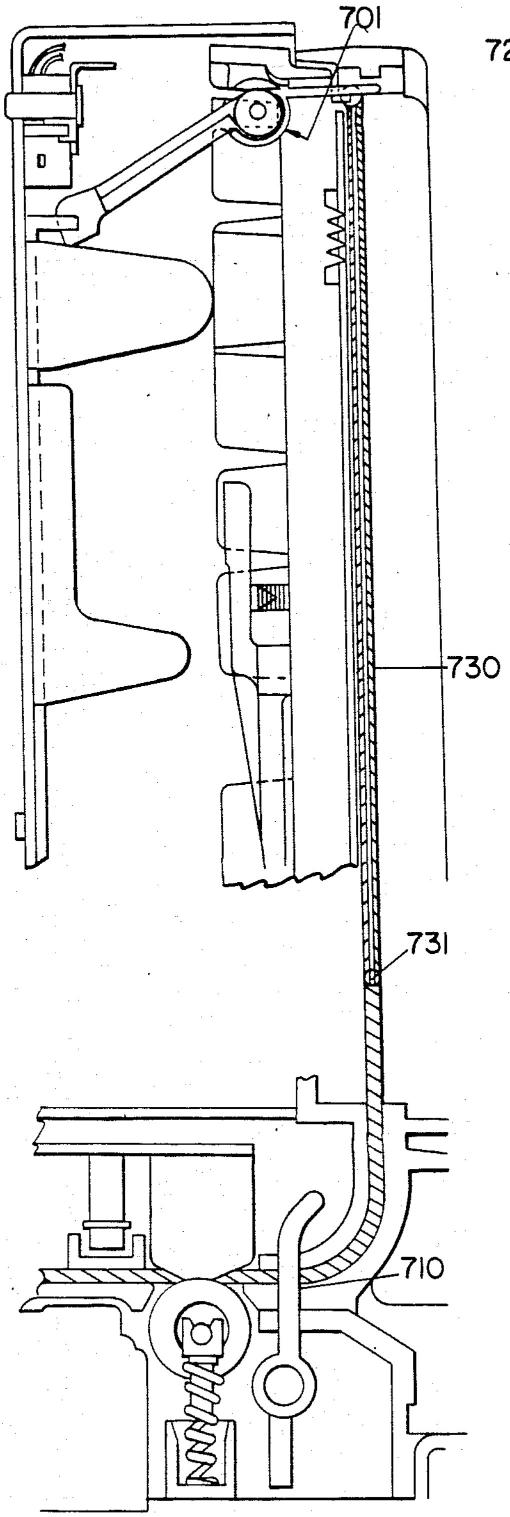
FIG. 10 is a second partial cutaway side view of the banknote handling apparatus of FIG. 1 with the banknote driven fully into the stacker so it is sensed by the top of the stacker sensor as in a ready for stacking position.
Figure 9:
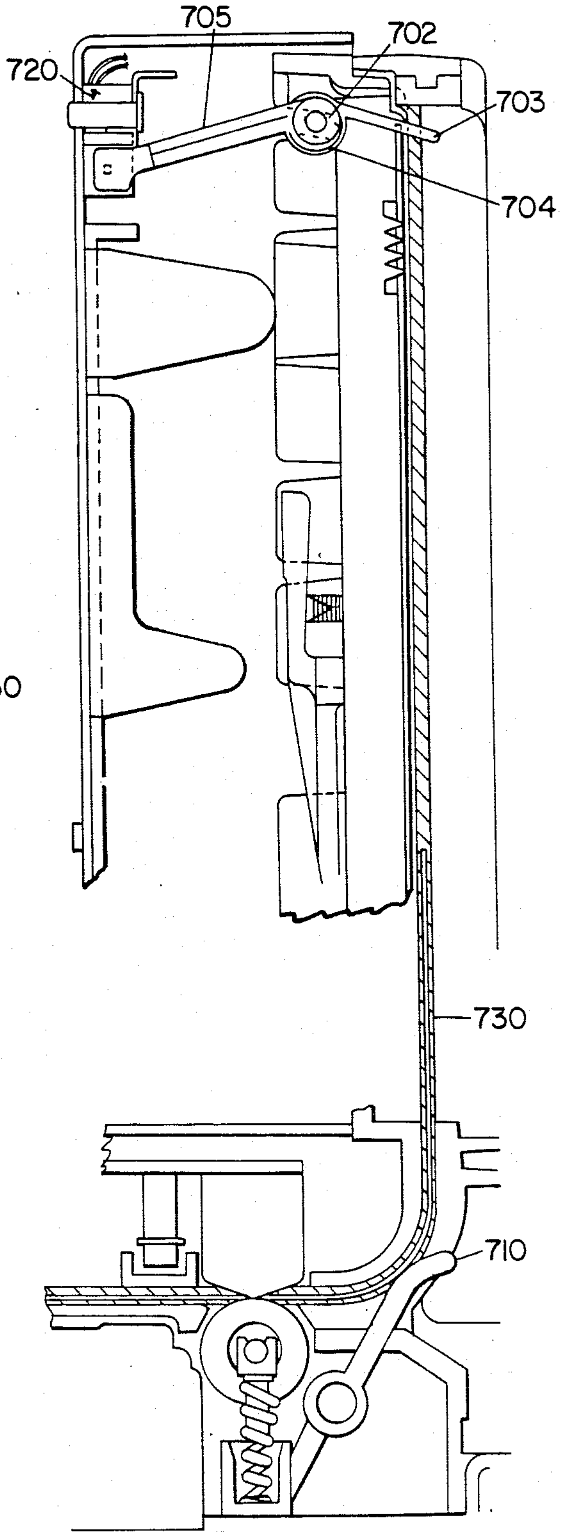
FIG. 9 is a partial cutaway side view of the banknote handling apparatus of FIG. 1 illustrating details of an improved top of the stacker sensor with a banknote in the apparatus which has not been driven up to the top of the stacker.

A jam detector 710 (illustrated in FIGS. 9 and 10) is mounted in the validator 100. The jam detector 710 protrudes across the banknote path in the interconnection region 120. Jam detector 710 allows banknotes to be freely driven through it by inclining out of the banknote path as is illustrated in FIG. 9; however, it is biased to return to its blocking position once the banknote has passed by as shown in FIG. 10 thereby making it impossible to pull an accepted banknote back out of stacker 200 once it has been accepted. As will be discussed further below, jam detector 710 also provides an indication that the banknote has been driven into the stacker 200.

Preferably, interconnection means in the interconnection region 120 establish a smooth uninterrupted path for a banknote to follow in leaving validator 100 and entering stacker 200. The presently preferred interconnection means are described in detail in the earlier application U.S. Ser. No. 709,559, assigned to the assignee of the present invention, the disclosure of which is incorporated by reference herein. The interconnection means establishes the initial portion of the banknote path in the stacker 200 and serves to direct the leading edge of the banknote to the region 220 where the two side edges of the banknote are gripped between rollers 308, belts 312 and stacker drive rollers 114.

Stacker 200 includes a banknote transport means having a series of pairs of pulleys 306, 308 and 310, a pair of belts 312, and a pair of retractable pinch rollers 304. While FIG. 1 does not show both of each of the pairs of components, it should be recognized that one of each of the above components 306, 308, 310 and 312 is located on each side of the banknote path. In the arrangement shown generally in FIG. 1, the transport means 300 is driven by a banknote transport means drive which in the embodiment of FIG. 1 is the validator roller 114 and its drive means 116 which is controlled by microprocessor 150.

Figure 2:
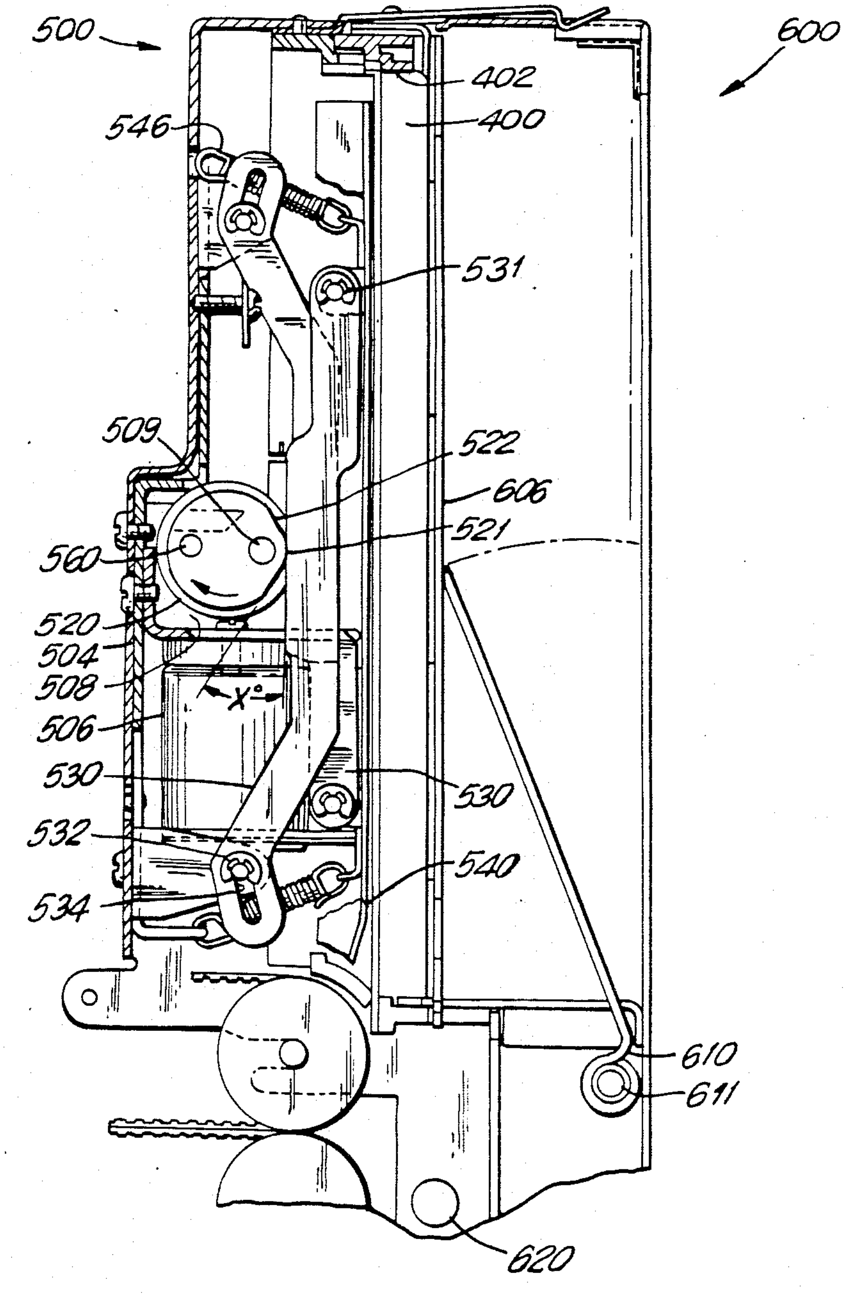
FIG. 2 illustrates details of the pusher of the stacker of FIG. 1 in its home position.

Transport means 300 transports the accepted banknote from the stacker's entrance into prestorage compartment 400, shown in FIG. 2. In a fashion somewhat analogous to the way that a picture frame holds a picture, compartment 400 frames the banknote and holds it stiff prior to stacking. It should be understood that compartment 400 does not "frame" the leading and trailing edges of a banknote but only its two side edges. The central region of compartment 400 is open forming a "window", and a pusher plate 540 which is part of pusher means 500 (shown in FIG. 2) passes through this opening as it strips a banknote from compartment 400, and pushes it into the banknote magazine 600.

After the accepted banknote is fully driven into compartment 400 by the transport means 300, retractable pinch rollers 304 (shown in FIG. 1) are retracted, and pusher means 500 is operated. Pusher means 500 forces the accepted banknote from prestorage compartment 400 into a stack in banknote magazine 600 where it is stored until removed. The magazine 600 is designed to be readily removed or opened so that stacked banknotes can be removed. Now that the overall operation from banknote insertion to stacking and removal has been briefly discussed, the details of apparatus according to the present invention will be described in greater depth.

The preferred embodiment of the present invention is useful with apparatus constructed similar to and which operates in large part in the same manner as the stacker apparatus shown and described in U.S. application Ser. Nos. 709,559 and 904,714. Consequently, the disclosure of this latter application is also incorporated herein by reference: however, the present invention may be used with other validator and stacker arrangements.

Pusher and Pusher Braking Details

Figure 3:
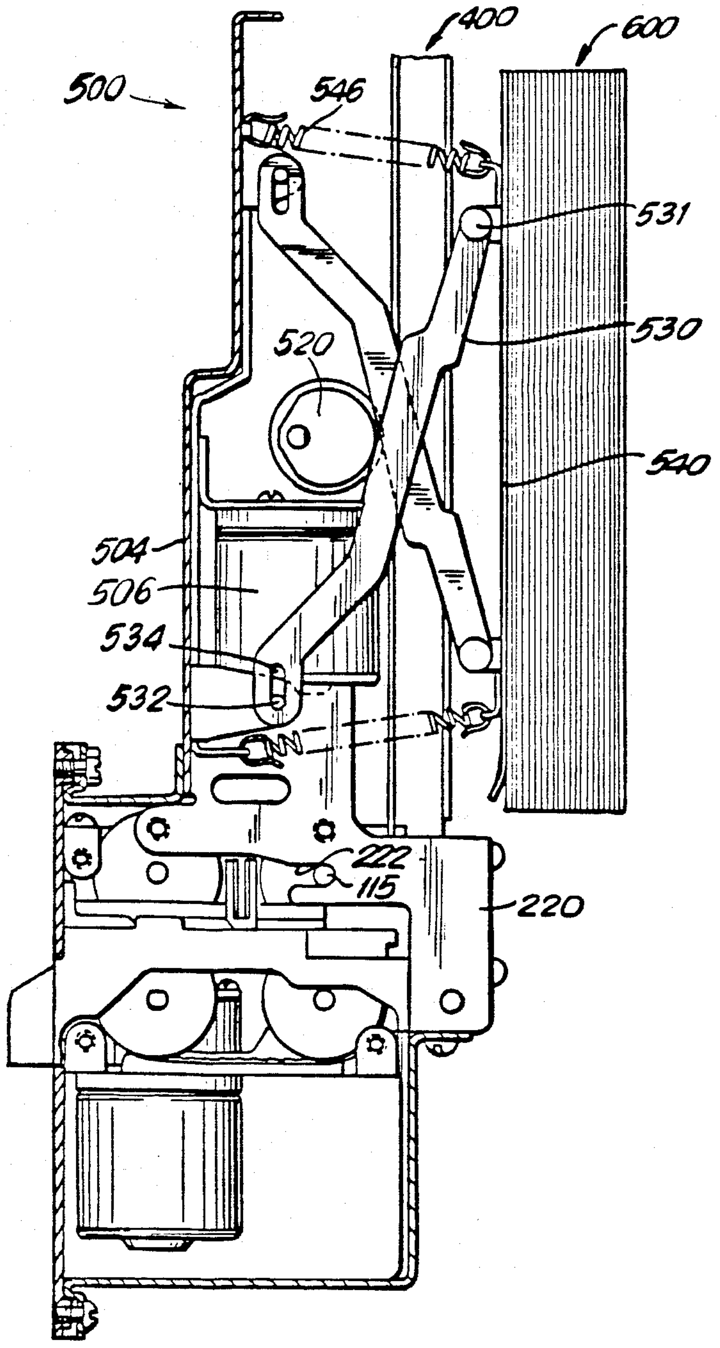
FIG. 3 illustrates further details of the pusher of the stacker of FIG. 1 away from its home position.

The pusher 500 is best illustrated in FIGS. 2 and 3. Pusher 500 includes a pusher actuating mechanism consisting of a chassis 504, motor 506, right angle gear train 508, two cams 520 mounted on the gear train output shaft, a pair of scissors 530, a pusher plate 540 and extension springs 546. Each scissor 530 is supported at one end by a clevis pin 531 to the pusher plate 540 and at the other end by a second clevis pin 532 to the chassis 504 through an elongated slot 534. Additionally, each scissor 530 is held against one of the cams 520 by means of the force exerted by the springs 546.

The cams 520 are eccentric and have two cam surfaces. On one side is the cam surface 521 upon which the scissors rest. On the other side is the cam surface 525 which drives a retractable roller arrangement in a first embodiment, and which drives a sensing switch arrangement in a second embodiment described further below in connection with discussion of FIG. 5. The cams 520 are mounted on a shaft 509 of the gear train 508, and they rotate when motor 506 causes gear train 508 to turn the gear train shaft 509. Home position of the pusher plate 540 and scissors 530 is defined when the pusher plate and scissors are in their closest proximity to shaft 509 as shown in FIG. 2. The home position is maintained over a large range of cam position by providing two flat cam sides 522 as part of cam surface 521. As the cam rotates about its axis through the region determined by the flat sides 522 of cam surface 521, no motion is imparted by cam 520 to scissors 530 and pusher plate 540. Once cam 520 has rotated through the region defined by the flat sides 522, the round portion of cam surface 521 begins to move the scissors 530 and pusher plate 540 through the window in the prestorage compartment 400. Cam surface 521 preferably includes two flat sides at an angle of x degrees as shown in FIG. 2. In the preferred embodiment, the angle x is approximately 45 degrees. As pusher plate 540 is forced through the window, a banknote in prestorage compartment 400 is moved into banknote magazine 600. As the cam 520 continues to rotate, the scissors 530 finally are fully extended as illustrated in FIG. 3.

For pusher means 500 to function properly, it is necessary to control the time at which pusher means 500 is turned on thereby causing a pusher cycle to begin. A drive means, such as the motor 506, should be turned on shortly after a banknote has fully entered prestorage compartment 400. The pusher plate 540 should not begin to push through the opening if there is no bill in compartment 400 or when a bill is only part way into the compartment 400. It is also necessary to control the time at which motor 506 is turned off to insure that the pusher plate 540 has returned to its beginning position before stacker 200 attempts to drive another banknote into compartment 400.

In one embodiment, a control signal to turn motor 506 on so that cam 520 rotates clockwise is produced after a sufficient time has passed for an accepted banknote to fully enter the prestorage compartment 400. Alternatively, as illustrated in FIGS. 9 and 10, a top of the stacker banknote position sensor 701 may be used to sense that a banknote is in the proper position for stacking, and a start control signal is then produced in response to a signal from that banknote position sensor. Following a motor on signal, cams 520 begin to rotate. The pusher plate 540 pushes the banknote through the opening and into the banknote magazine 600. The banknotes already in magazine 600 are clamped between the pusher plate 540 and pressure plate 606 which in turn is exerting a force against pressure spring 610. Once the pusher plate returns to its home position, it is necessary to sense that the pusher cycle has been completed and to turn off motor 506. The presently preferred embodiment for sensing the end of the pusher cycle is to embed a magnet 560 in the face of cam surface 521, and to sense the position of magnet 560 using a Hall effect sensor 561 (shown in FIG. 4) mounted on a printed circuit board 569 which is attached to the stacker housing. The Hall effect sensor 561 produces an output signal when the cam 520 has completed a cycle, and this output signal is suitably processed by the microprocessor 150 and used to control braking and turn off of the motor 506 at the proper time. In the preferred embodiment, a second clockwise rotation of cam 520 is included in the pusher cycle to ensure proper stacking.

Figure 5:
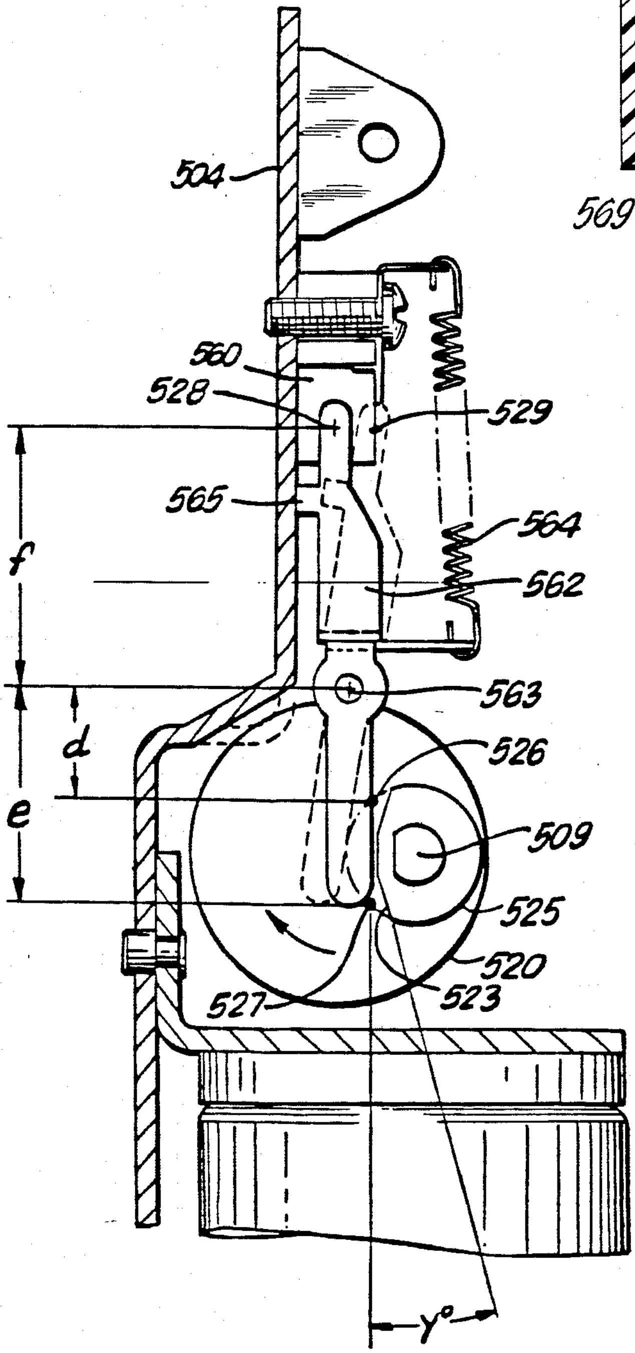
FIG. 5 illustrates details of an alternative to the Hall effect sensor of FIG. 4 for detecting the position of the stacker motor of the pusher of FIG. 2.

The pusher 500 of FIGS. 2 and 3 may be modified as shown in FIG. 5 to provide an alternative sensing arrangement to that of Hall effect sensor 561, and it should be recognized that various other sensing arrangements including the use of light emitting sources and light detectors might be used to sense the position of pusher 500. As shown in FIG. 5, pusher 500 additionally includes a position sensor switch 560, and a sensing switch activating fork 562 together with fork spring 564. Magnet 560 (shown in FIG. 2) is no longer included.

The cam surface 525 (FIG. 5) now drives the sensing switch activating fork 56 rather than the retractable roller arrangement. The cams 520 are mounted on shaft 509 of gear train 508, and they rotate when motor 506 causes gear train 508 to turn the gear train shaft 509. As previously, home position of the pusher plate 540 and scissors 530 is defined when the pusher plate and scissors are in their closest proximity to shaft 509 as shown in FIG. 2.

Figure 6:
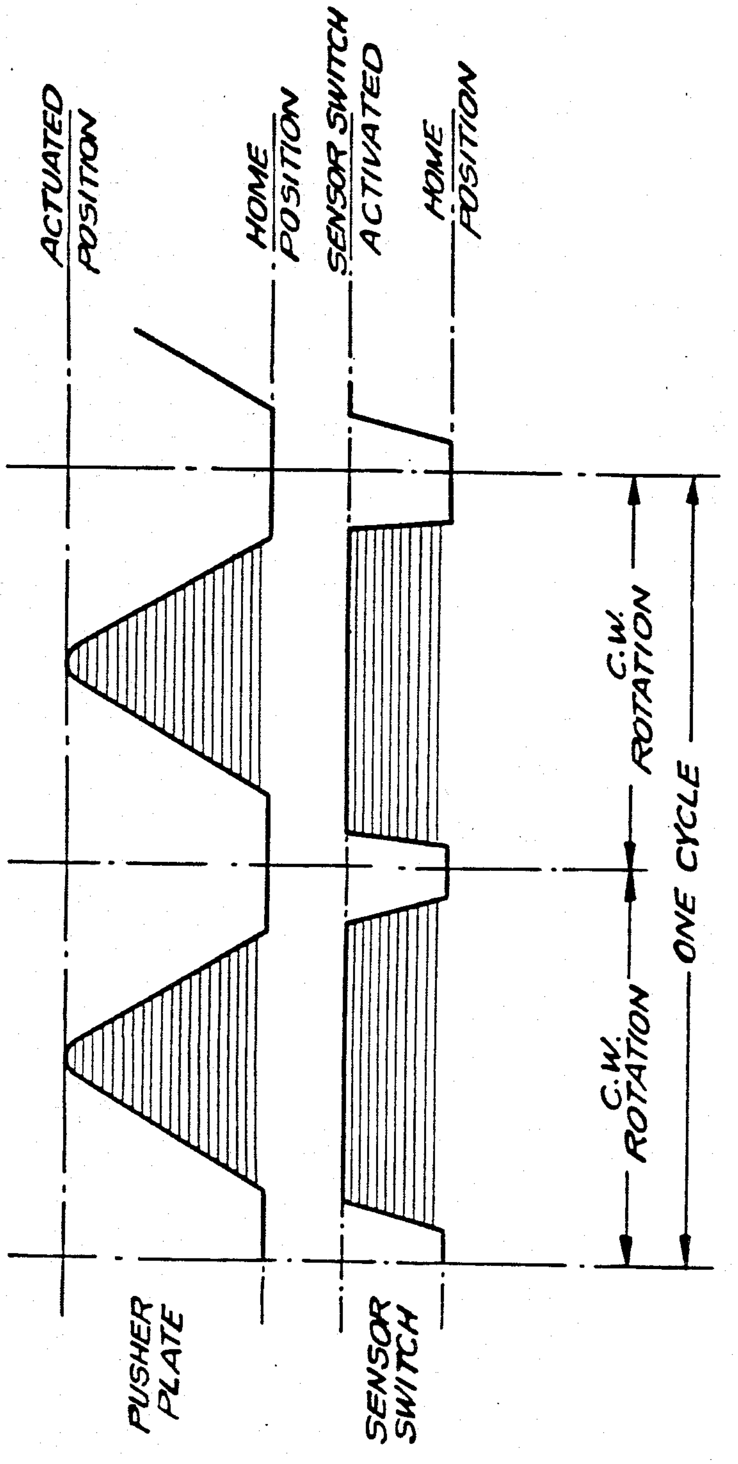
FIG. 6 is a pair of graphs illustrating the cycle of operation of the pusher plate and the sensor arrangement of FIG. 5.

The relationship of the pusher plate 540 and sensor switch 560 is illustrated in FIG. 6 for one cycle of two clockwise rotations.

Figure 7:
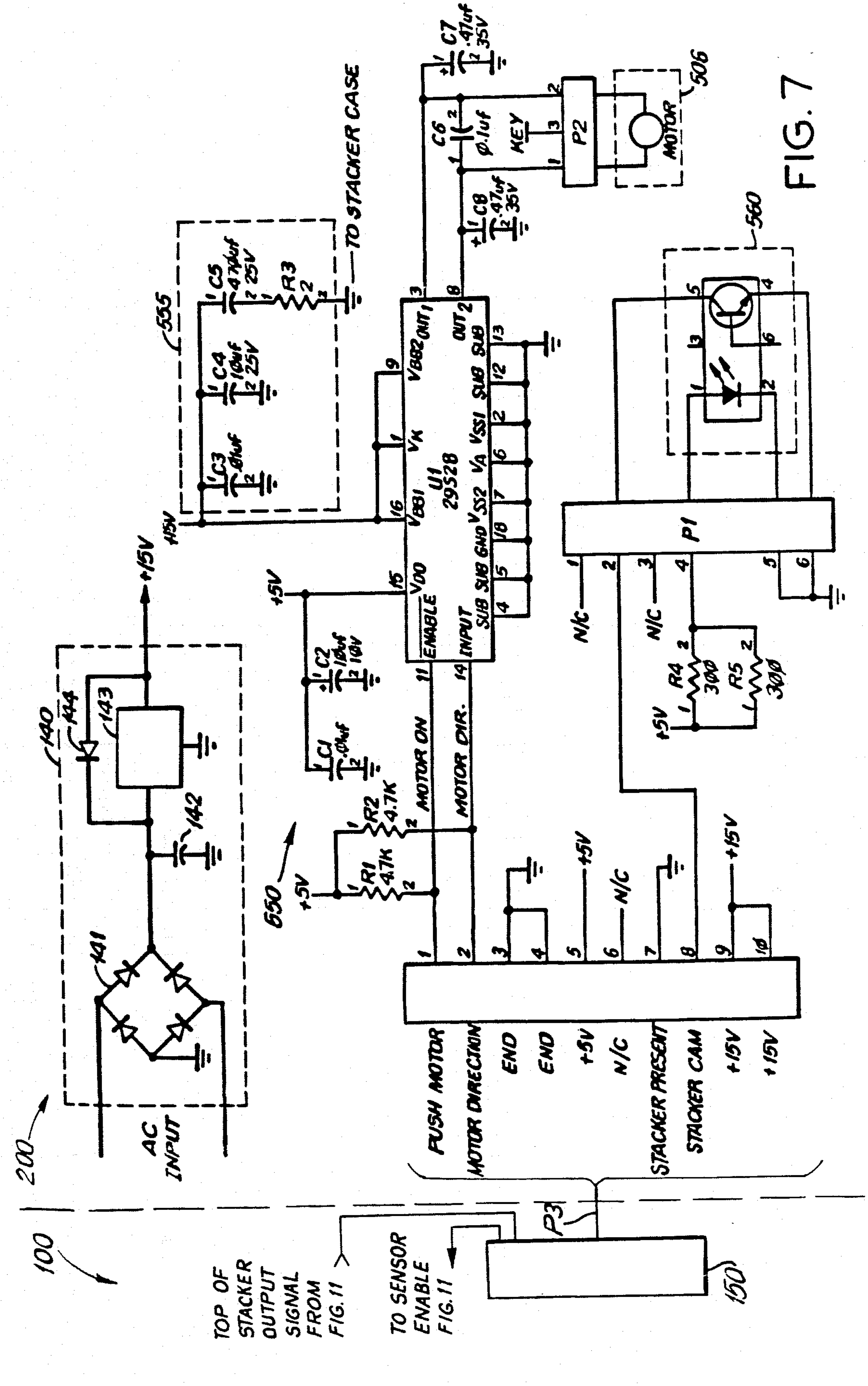
FIG. 7 is a circuit diagram of one embodiment of electronic control circuitry for controlling the operation of the pusher.

For both sensing arrangements according to the present embodiment, the electronic circuitry for controlling motor 506 is located on a printed circuit board mounted in stacker 200 which is connected to and controlled by the microprocessor 150 located in the validator 100. The preferred embodiment of this circuitry is shown in FIG. 7 as circuit 550. Circuit 550 includes connector P1, connector P2, connector P3, motor control chip U1, sensor switch 560, motor 506, as well as, discrete resistors and capacitors connected as shown therein. It should be noted that switch 560 and motor 506 while connected to circuit 550 are not on the printed circuit board. Connector P3 makes several connections to the logic circuitry of validator 100. One connection is for signal from validator 100 which establishes whether pusher motor 506 should be turned on or off. A second connection is for a signal from validator 100 which establishes which direction motor 506 should turn. A third connection provides a signal to validator 100 that the stacker 200 is attached to validator 100. Finally, a fourth connection provides a signal to validator 100 indicating whether the cams 520 are at home position or not. Connector P1 connects sensor switch 560 to the printed circuit board and a sensor signal through connector P3 to validator 100. Connector P2 connects pusher motor 506 to motor control chip U1 which controls the power delivered to motor 506. In response to "motor on" and "motor direction" signals from connector P3, chip U1 determines the sense with which 15V is applied to motor 506. Since the control signals to cause circuit 550 to turn the motor 506 on and off, and to control its direction of rotation are produced by logic circuits in validator 100 such as a microprocessor control circuit, this arrangement allows the use of the single microprocessor 150 in the validator-stacker unit rather than having one in validator 100 and one in stacker 200.

In the present embodiment, a control signal to turn motor 506 on so that cam 520 rotates clockwise is produced after a sufficient time has passed for an accepted banknote to fully enter the prestorage compartment 400. Alternatively, a banknote position sensor might be used to sense that a banknote is in the proper position for stacking, and a start control signal is then produced in response to a signal from that banknote position sensor. Following a motor on signal, cams 520 begin to rotate. Once cams 520 have rotated more than x. (FIG. 2) in the clockwise direction, the scissors 530 are extended thereby pushing the pusher plate 540. In the process of extending the pusher plate 540 the banknote is pushed through the opening and into the banknote magazine 600 as shown in FIG. 3. The banknotes already in magazine 600 are clamped between the pusher plate 540 and pressure plate 606 which in turn is exerting a force against pressure spring 610. During this process, the edges of the bill previously in channels of the banknote path are folded inward by the side walls of the opening and spring back to an essentially flat position upon clearing bill retention tabs. The banknote is now held in the stack by the force of the pressure plate 606 and bill retention tabs, and the pusher plate 540 returns to its home position as shown in FIG. 2. In the preferred embodiment, the pushing sequence is repeated with the cam 520 rotating a second full cycle in the clockwise direction to insure that banknotes are properly stacked in magazine 600. The validator is now ready to accept another bill.

In order to reverse motor rotation and to stop motor 506 at the appropriate time, sensing means are provided to sense when the cams 520 have completed a first rotation and returned to their home position for the first time, and also to sense when a second rotation has been completed. At this point, motor rotation is reversed for a period based upon a braking time as will be discussed further below. Also, in the preferred embodiment, a maximum time is allowed for a complete push to be completed. If this time is exceeded, the motor 506 is deenergized. The magazine 600 is either full, or a jam or other malfunction has occurred, and the validator-stacker unit shuts down until the unit is serviced by service personnel.

While the pusher 500 as shown and described above is used with transport means 300, prestorage compartment 400, and banknote magazine 600, in other embodiments, it might be used with any suitable banknote positioning means for receiving banknotes from a validator and positioning them properly relative to the pusher plate 540, and any suitable banknote storage compartment for facially stacking banknotes.

Braking Details

While in the prior stacker applications referred to above, a fixed braking time was used, the present invention recalculates the brake time to be used based upon a measurement of the speed of the pusher motor assembly as measured by measuring the speed of driving cams 520. In the preferred embodiment, the pusher motor 506 causes the driving cams 520 to complete two full rotations in the same direction. The speed of the pusher motor assembly is calculated by measuring the time it takes for the driving cams 520 to rotate a fixed portion of a revolution such as the time to rotate through the home position, and the braking time is computed therefrom.

Figure 4:
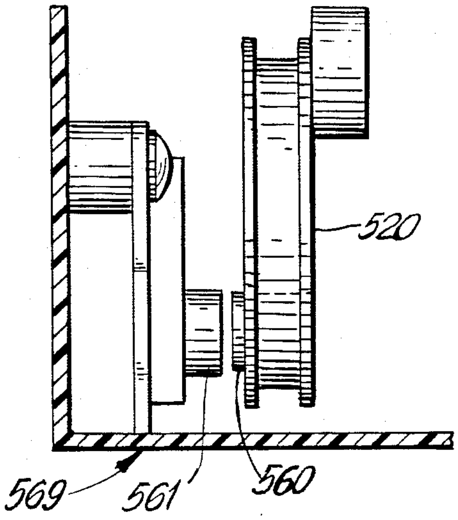
FIG. 4 illustrates details of a Hall effect sensor for detecting the position of the stacker motor of the pusher of FIG. 2.

The time in the home position is sensed by a sensing means such as either the Hall effect sensor 561 of FIG. 4, an optical sensor and interrupter, or the sensing switch arrangement illustrated in FIG. 5. The microprocessor 150 shown in FIG. 7 and associated logic circuitry compute the duration of the time spent in the home position.

Figure 8:
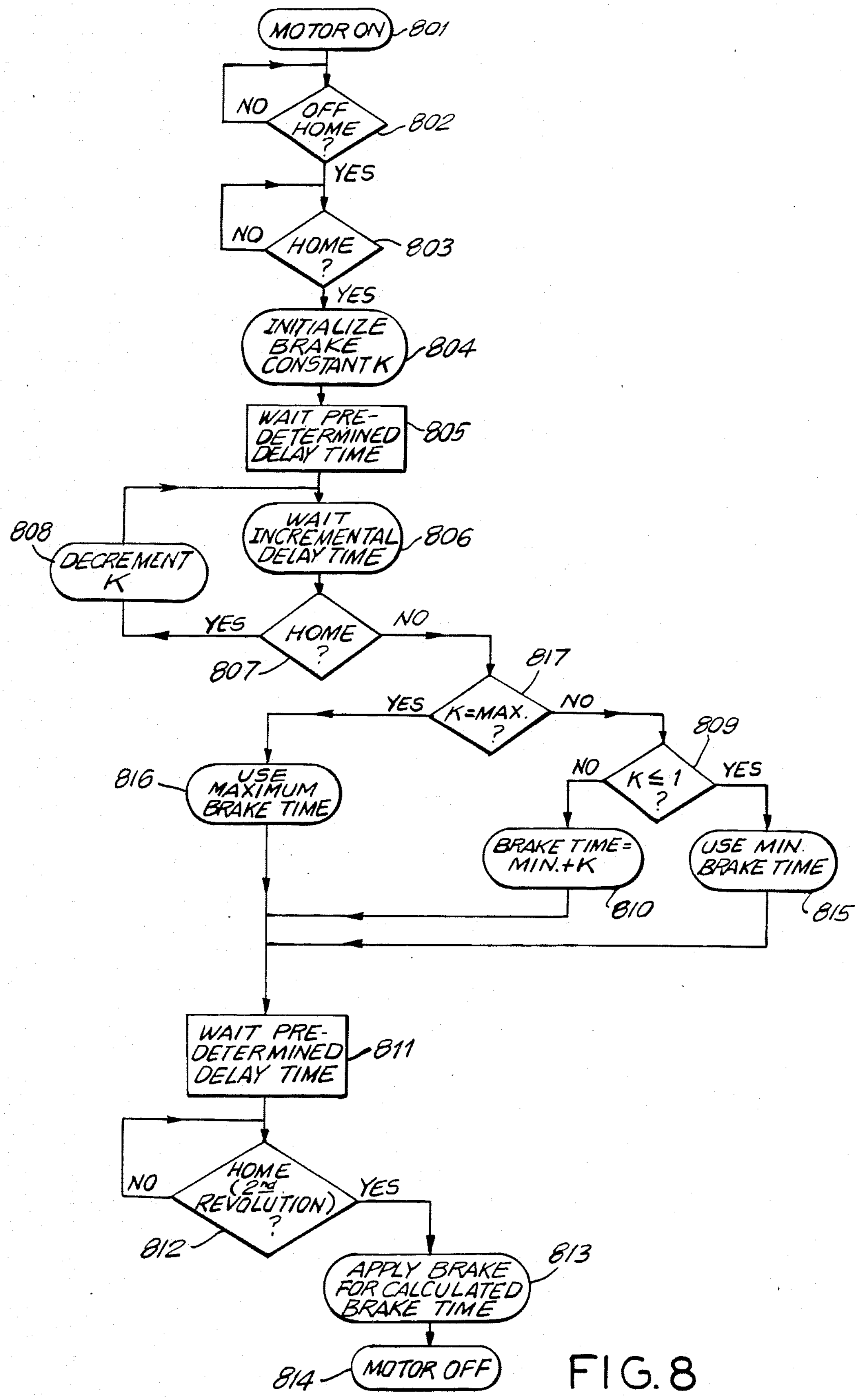
FIG. 8 is a flowchart of one embodiment according to the present invention for computing a brake time.

The flowchart of FIG. 8 illustrates the preferred method for computing a braking constant, and controlling the motor 506. First, at step 801, a control signal is produced to turn on the stacker pusher motor 506. If the motor 506 is operating properly, its drive shaft begins to turn, and the driving cam 520 also begins to turn. Next, at step 802, the microprocessor 150 checks the sensing means to see if the driving cam 520 is off the home position. If not, the microprocessor 150 waits and checks again later. In other words, step 802 is repeated. The microprocessor 150 loops until an off-home position is detected. Once the off-home position is detected, the microprocessor 150 proceeds to step 803, and checks to see if the driving cam 520 has returned to the home position. Again, the microprocessor 150 loops (repeats step 803) until the desired position is detected. Once home position is again detected, the microprocessor 150 proceeds to step 804 where it initializes a brake constant k at a value based on the difference between the braking times for the fastest and slowest allowable pusher motor speeds.

By way of example, if the fastest allowable pusher motor has a home duration time of 100 msec and requires 10 msec of braking (the maximum braking time) and the slowest allowable pusher motor has a home duration time of 200 msec and requires 5 msec of braking (the minimum braking time), the braking constant k is set at 5 msec, as the difference between the fastest and slowest braking times is 10 msec minus 5 msec which equals 5 msec.

Proceeding with this example, the next step 805 is for microprocessor 150 to wait a predetermined delay time. For our example, the fastest motor will complete a revolution in 100 msec so a predetermined delay of 100 msec is used. It should be recognized that a shorter time could be used in which case later values on the flowchart of FIG. 8 would be changed appropriately. At step 806, microprocessor 150 waits an additional incremental delay which is set as follows. Using our example, it is desirable to set the incremental delay time in increments based on the differences between the fastest and slowest home duration times. The difference between 100 msec and 200 msec is 100 msec. Dividing this 100 msec difference by the brake constant k of 5 msec results in increments of 20 msec.

Microprocessor 150 delays the minimum time of 100 msec, waits an additional 20 msec, and checks again to see if the driving cam 520 is still sensed at the home position. If the driving cam 520 is still at home, k is decremented from 5 msec to 4 msec at step 808. Microprocessor 150 again waits 20 msec and checks to see if the driving cam 520 is still at home. If it is, k is decremented again to 3 msec. Microprocessor 150 again waits 20 msec and checks again to see if the driving cam 520 is still sensed at home. Assuming the motor speed is such that a home duration of 150 msec occurred, microprocessor 150 will now detect that the driving cam is no longer at home, as when $k=3$ msec, 160 msec have elapsed.

The microprocessor 150 next proceeds to step 817 in the flowchart of FIG. 8. It now determines if $k=$ a maximum value which for our example is 5 msec. Since $k=3$ msec, the microprocessor 150 proceeds to step 809 to determine if $k<1$ msec. For our example, it is not and the microprocessor 150 proceeds to step 810 to compute a brake time equal to the minimum brake time of 5 msec$+(k=3$ msec) for a total of 8 msec. Microprocessor 150 again waits a predetermined delay time at step 811 and then checks to see if home position is sensed again at step 812. In other words, has the driving cam 520 returned to the sensed home position a second time thus completing its second revolution. If not, the microprocessor 150 loops until the home position is sensed. Once the home position is sensed, the microprocessor 150 produces a braking control signal at step 813 for the duration of the previously calculated brake time. Finally, the microprocessor 150 turns the pusher motor 506 off at step 814.

Returning to the step 809, $k<1$ msec, of the flowchart of FIG. 8. For our example, k equaled 3 msec. Consequently, k was not less than 1 msec; however, if k had been less than 1 msec, the microprocessor would have determined at step 815 that it should apply the minimum brake time of 5 msec at step 813.

Finally, returning to the step 817, $k=\max$. If k had equalled the maximum of 5 msec for our example, then the microprocessor would have determined at step 816 that it should apply the maximum brake time of 10 msec at step 813.

Banknote Transport Means Braking

As briefly discussed above, in the presently preferred embodiment, the top of the stacker banknote position sensor 701 illustrated in FIGS. 9 and 10 is used to detect when a banknote is ready for stacking. The use of alternate sensors can be employed with equal results. Such sensors include Hall effect sensors, optical reflective sensors and the like. Further, while the present embodiment drives a banknote up before stacking, other arrangements might drive the banknote down.

FIGS. 9 and 10 illustrate the presently preferred banknote position sensor 701 though it should be recognized that other position sensors might be used. The banknote position sensor 701 comprises a spring biased lever 702 with an extension arm 703 which interrupts the banknote path and a sensor arm 705. In its normal position shown in FIG. 9, the extension arm 703, is spring biased by a torsion spring 704 into the banknote path while the sensor arm 705 blocks an optical sensor 720. Spring 704 is selected so that acceptable, worn banknotes will provide enough force to push extension arm 703 up. When a banknote 730 is driven fully into the prestorage compartment 400 as shown in FIG. 10, the extension arm 703, is pushed up against the force of spring 704 and the sensor arm 705 is moved away from the optical sensor 720. The sensor 720 is shown schematically in FIG. 11 as an optical sensor which operates as discussed below.

Figure 11:
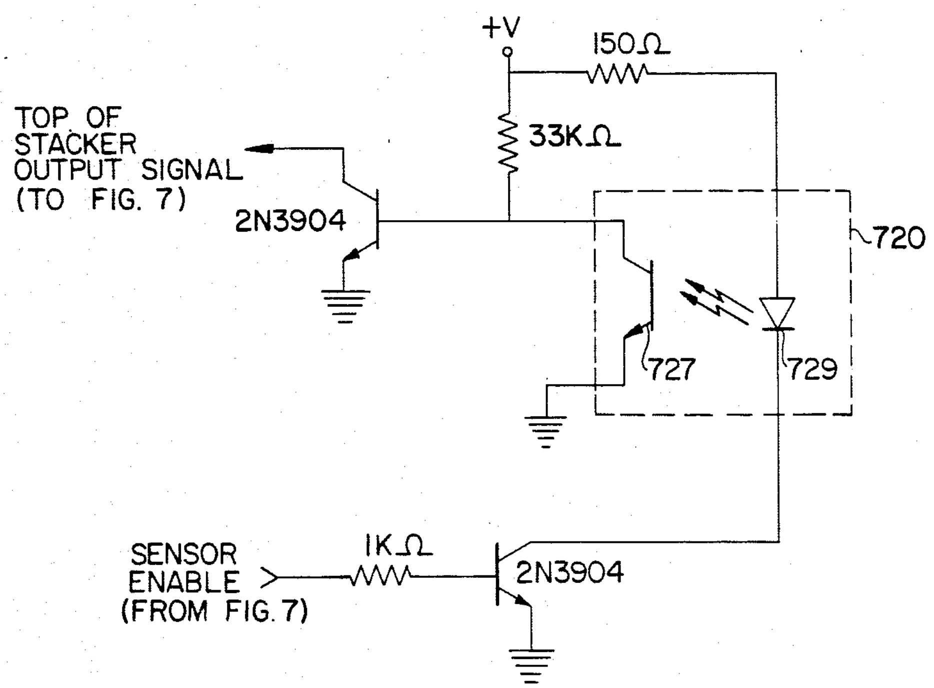
FIG. 11 is a schematic diagram of an electronic circuit for monitoring the state of the top of the stacker sensor of FIGS. 9 and 10.

Optical sensor 720 includes a phototransistor 727 which receives the output of a light emitting diode (LED) 729 when there is nothing between phototransistor 727 and LED 729. As shown in FIG. 11, when the extension arm 703, is in the banknote path, as shown in FIG. 9, the light beam is blocked or interrupted by sensor arm 705. Hence, the output of the receiving phototransistor 727, shown in FIG. 11, acts as a switch, closed when light is received; open when light is blocked. The detection of the state (open or closed) of the top of the stacker sensor 720 is monitored by the microprocessor 150 (FIG. 7).

Figure 12A:
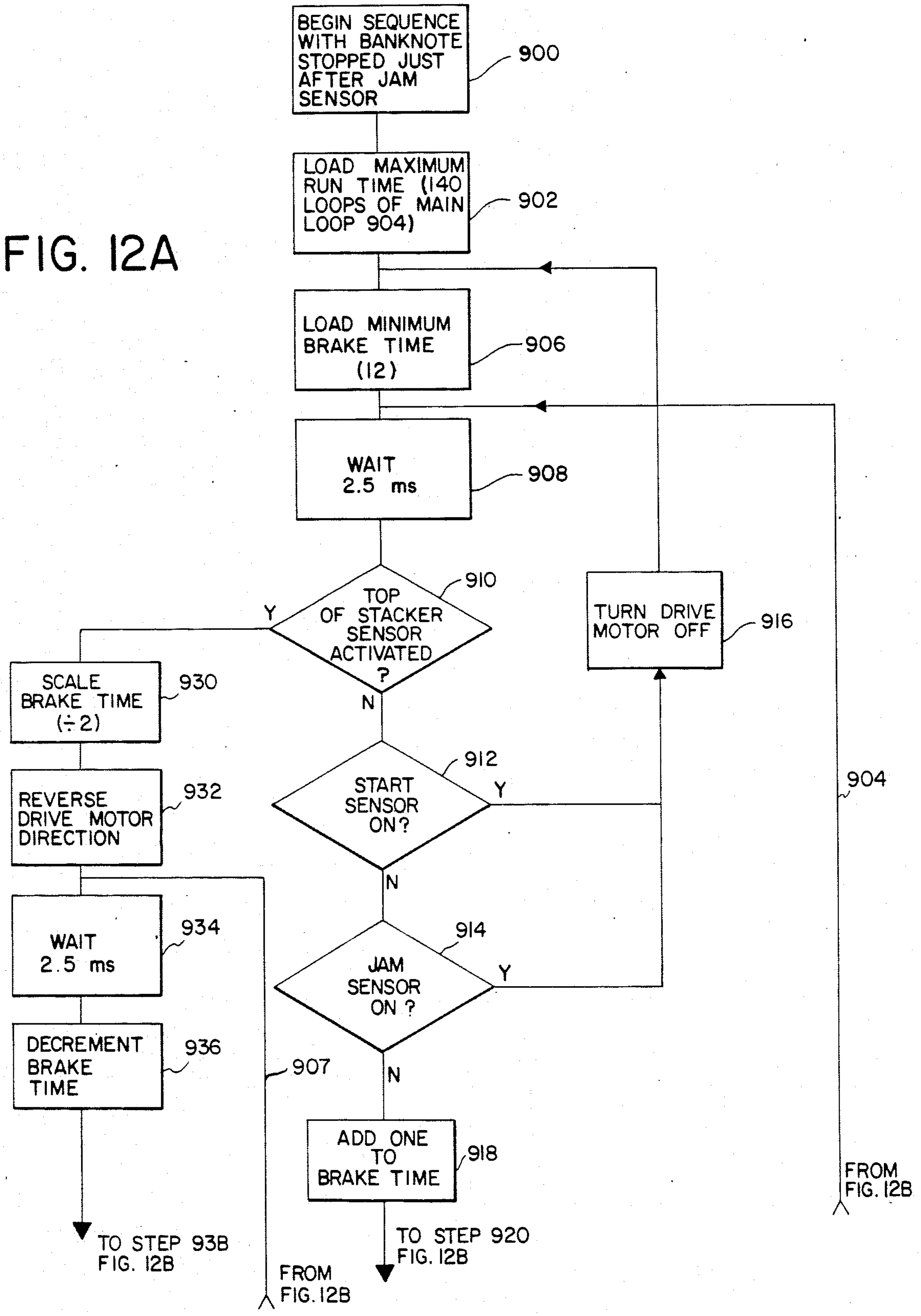
FIG. 12, consisting of two drawing sheets labeled FIGS. 12A and 12B respectively, is a flow chart for controlling the banknote transport assembly which drives the banknote into the ready for stacking position according to the present invention.
Figure 12B:
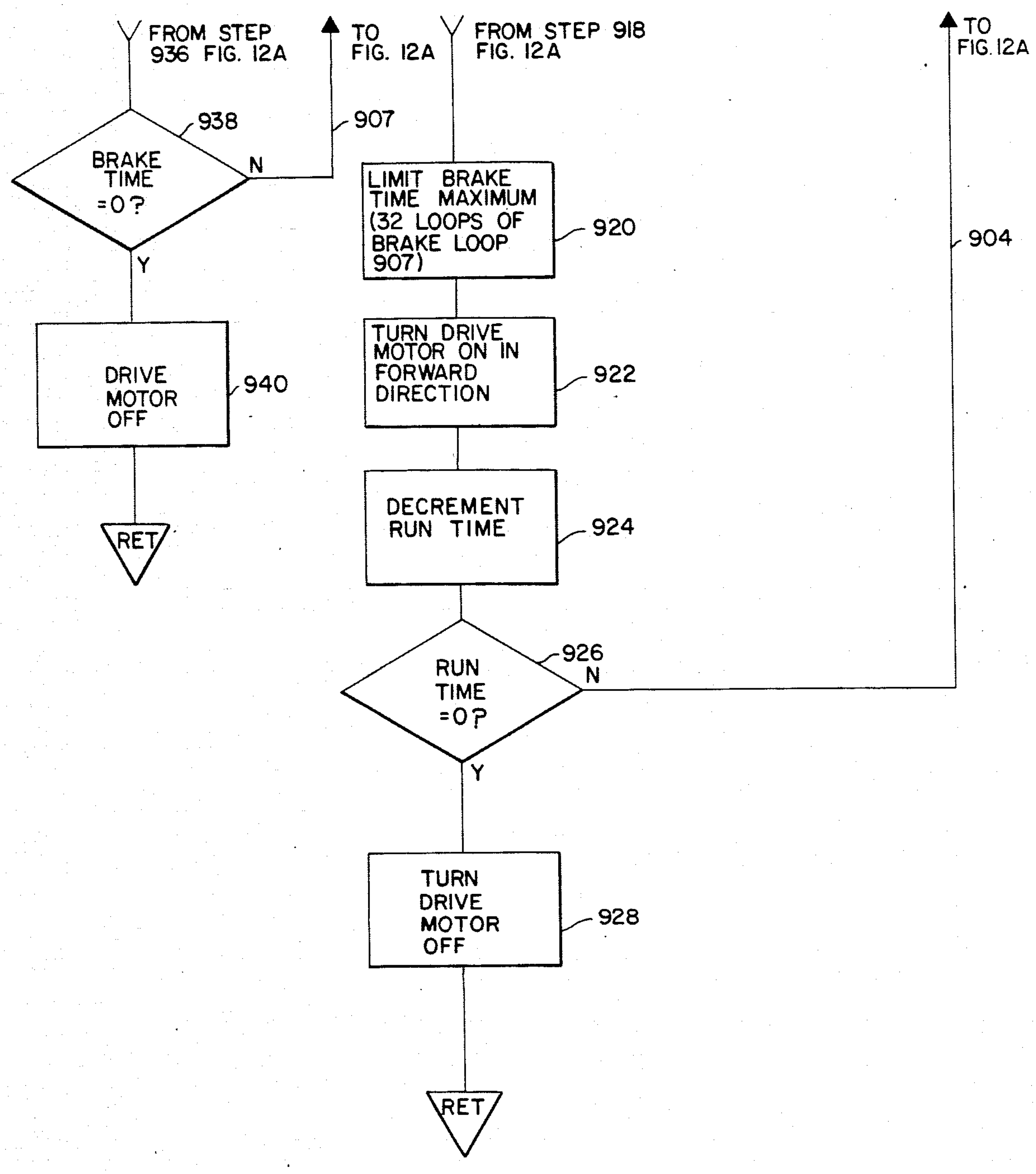

The details of the presently preferred control sequence for controlling banknote passage from validator 100 to the top of prestorage compartment 400 where it is ready for stacking follows below in conjunction with discussion of the flow diagram of FIG. 12. The flow chart of FIG. 12 illustrates the preferred method for computing a braking constant and controlling the motor used for positioning or driving a banknote 730.

After the banknote 730 has been validated by the validator 100, it is driven up into the stacker 200 until its trailing edge 731 is past the jam sensor 710. The detection of the jam sensor 710 in its normal position (shown in FIG. 10) causes the microprocessor 150 to reverse the power drive to the motor which is part of drive means 116 for a fixed time to brake the motor and stop the banknote 730 at an initial stop or post jam detector stop position. Small variations in the position of banknotes stopped at this initial stop position are insignificant relative to the distance from this initial stop position to the top of the stacker sensor 720. However, it should be noted that a braking constant proportional to the speed of the banknote prior to this initial stop could be calculated and applied for precision braking.

From the initial stop position, the banknote 730 must be moved further up into the stacker 200 and into the ready to be stacked position (shown in FIG. 10) prior to transfer to the banknote magazine 600. The motor of drive means 116 is powered and a timer is used to measure the time required for the banknote 730 to reach the top of stacker sensor 720. This sequence is accomplished in a manner best described by reference to FIG. 12.

As discussed above, the banknote 730 passes through the validator 100 to the stacker 200. As the banknote passes the jam sensor 710, a fixed brake is applied and the banknote is stopped just after the jam sensor. With banknote 730 in this position the subroutine of FIG. 12 begins with step 900. At step 902, a maximum run-up time is set. As indicated in parentheses in step 902, the maximum run-up time is set at 140 loops through the main loop 904 which is inclusive of steps 908 through 926.

Next, a minimum brake constant is set up in step 906. In the flow chart of FIG. 12, the minimum brake constant is established in step 906 as 12. The minimum brake time will be this constant divided by two times the length of time to proceed through brake loop 907. Brake loop 907 is inclusive of steps 934 to 938. Following step 906, the main loop 904 is entered. The first step of main loop 904 is a wait step 908.

At step 908, the sequence waits 2.5 milliseconds (msec) before preceding to step 910. Because the execution of the remaining steps 910–926 in main loop 904 takes approximately 0.5 msec, each execution of the main loop 904 takes a total of approximately 3 msec. Consequently, the maximum run time established in step 902 is (140 loops×3 msec/loop=420 msec) approximately 0.5 sec.

In proceeding through main loop 904, a number of tests are done by the microprocessor 150. First, at step 910, the top of the stacker sensor 720 is checked to see if the leading edge of banknote 730 has activated the sensor 720. If it has, the sequence branches to step 930 as will be discussed further below. Since in our example, banknote 730 has just been started after having been stopped in the post jam detection stop position, the leading edge of banknote 730 will not have reached the top of the stacker, and the top of stacker sensor 720 will be detected in its normal position. Consequently, the sequence proceeds to step 912. At step 912, microprocessor 150 checks to determine if start sensor 104 (FIG. 1) in validator 100 is detecting a banknote or some other object. If start sensor 104 is on, that is detecting an attempt to insert a second banknote into banknote handling apparatus 10 before the first banknote has been stacked, this is detected at step 912, and the program branches to step 916 at which point the drive means 116 is turned off by microprocessor 150. From step 916, the program loops back to step 906 which resets the brake time to the minimum. If the start sensor 104 is no longer on, the drive motor is restarted, and the process continues.

For purposes of this example, it will be assumed that start sensor 104 was not detected as on, and consequently, step 914 follows step 912. At step 914, jam sensor 710 is checked to see if it is in its on position as illustrated in FIG. 9 or its off position shown in FIG. 10. If jam sensor 710 is on, then a second banknote or some other object is obstructing the jam sensor 710. This condition is undesirable and if detected, the program loops to step 916 and the drive motor is stopped until the jam sensor 710 is detected as cleared, and the brake time is reset to a minimum again at step 906.

Again for purposes of this example, it will be assumed that the jam sensor 710 was clear at step 914. Consequently, the program proceeds to step 918 and the brake timer is incremented by 1. Thus, the brake timer originally set at 12 in step 906 becomes 13. In the presently preferred embodiment, a maximum brake count of 32 is imposed at step 920. At step 922, the drive motor is turned on in the forward direction if it was previously off. Consequently, at step 922, the drive motor will be turned on either on the first pass through the main loop 904 or on any subsequent pass through loop after the drive motor has been turned off at either step 912 or 914. At step 924, the run-up time is decremented. At step 926, the run-up timer is checked to see if the maximum run-up time has been reached. If the maximum run-up time has been reached, the drive motor is turned off at step 928, and the subroutine is completed. When the next banknote to be stacked is positioned in the post jam detector position the subroutine is repeated. The maximum run-up time is determined to provide reasonable performance in case the top of the stacker sensor 720 is not operating properly.

Returning to the discussion of FIG. 12, if the maximum run-up time has not been reached at step 926, the program loops back up to step 908. At any time prior to reaching the maximum run-up time when the top of the stacker sensor 720 is detected as activated by the leading edge of the banknote 730 at step 910, the program branches to steps 930–938 and the brake time is calculated based on the brake timer count reached in the main loop 904.

For example, if the brake timer count was 14, then at step 930 this count is scaled by dividing by 2 (14÷2=7). At step 932, the drive motor is reversed for the brake time defined by the scaled count of 7 and brake loop 907. A timeout of 2.5 msec is used in step 934. The brake timer is decremented in step 936 and checked to see if it equals zero in step 940. If not equal to zero, the brake loop 907 is repeated until the brake timer is zero and the motor is turned off in step 940. For our example, the brake loop 907 is repeated 7 times, and the drive motor is driven in the reverse direction (7 loops×2.5 msec/loop=17.5 msec) for approximately 18 msec.

From the above discussion, it is clear that the present invention provides for compensation for variations in the speed of banknote travel in banknote handling apparatus.

I claim:

1. An improved method of banknote position control for controlling the position of a banknote in a banknote handling apparatus for determining the validity of the banknote, in which it is desirable to stop a banknote positioning means at an appropriate position by applying a braking force for a computed time comprising the steps of:

measuring the time it takes the banknote positioning means to complete at least a predetermined portion of a cycle of operation;

computing a braking time based upon the measured time it took the banknote positioning means to complete said predetermined portion of a cycle of operation; and applying a braking force for the computed braking time to stop the banknote positioning means at the appropriate position.

2. The method of claim 1 wherein the banknote positioning means comprises a stacker pusher motor.

3. The method of claim 1 wherein the banknote positioning means comprises a banknote transporting means and the predetermined portion of a cycle of operation comprises the time it takes the banknote transporting means to transport a banknote from a first position to a second position.

4. The method of claim 3 further comprising the step of determining that the banknote has reached the second position by using a position sensing means to sense the leading edge of the banknote.

5. The method of claim 4 wherein the second position is a ready to be stacked position.

6. The method of claim 3 wherein the first position is a post jam detector position.

7. The method of claim 6 wherein the post jam detector position is a stop position occurring as the result of the insertion of a second banknote.

8. An improved method of controlling a banknote stacker pusher motor comprising the steps of:

measuring the time it takes the stacker pusher motor to complete at least a predetermined portion of a cycle of operation;

computing a stacker pusher motor braking time based upon the measured time it took the stacker pusher motor to complete said predetermined portion of a cycle of operation; and applying a braking signal to the stacker pusher motor for the duration of the computed braking time in order to stop the stacker pusher motor at an appropriate position at the end of the cycle of operation.

9. The method of claim 8 wherein during the cycle of operation of the stacker pusher motor, the stacker pusher motor causes a driving cam to rotate from a home position two revolutions, stopping back at the home position at the end of the two revolutions, and said predetermined portion of the cycle of operation is the time it takes for the driving cam to rotate through the home position at the end of the first revolution.

10. An improved stacker pusher motor control apparatus for a banknote comprising:

a stacker pusher motor having a defined cycle of operation;

means for measuring the time it takes the stacker pusher motor to complete a predetermined portion of the defined cycle of operation;

means for computing a braking time based upon the measured time it took the stacker pusher motor to complete the predetermined portion of the defined cycle of operation; and means for applying a braking signal to the stacker pusher motor for the duration of the computed braking time in order to stop the pusher motor at a predetermined position at the end of the defined cycle of operation.

11. An improved banknote transporting apparatus comprising:

banknote position controlling means for controlling the position of a banknote;

means for measuring the time it takes the banknote position controlling means to transport a banknote from a first position to a second position;

means for computing a braking time based upon the measured time it took the banknote position controlling means to transport the banknote from the first position to the second position; and means for applying a braking signal to the banknote position controlling means for the duration of the computed braking time in order to stop the banknote position controlling means at a predetermined position.

12. The apparatus of claim 11 wherein the banknote position controlling means comprises a belt and pulley arrangement which is driven by a drive means comprising a drive motor.

13. The apparatus of claim 11 further comprising a jam detector and wherein the first position is a post jam detector position.

14. The apparatus of claim 13 wherein the post jam detector position is a stop position occurring as a result of the insertion of a second banknote.

15. The apparatus of claim 11 further comprising a ready to be stacked position sensor and wherein the second position is a ready to be stacked position.

16. The apparatus of claim 11 wherein said means for measuring keeps track of the time elapsed from when the banknote leaves the first position and further comprising means for comparing the time elapsed with a predetermined maximum transport time; and means to stop the banknote position controlling means if the elapsed time equals or exceeds the predetermined maximum transport time.

17. An improved method of controlling a banknote stacker pusher motor comprising the steps of:

detecting a first off-home motor position;

detecting a first home motor position subsequent to detecting the first off-home motor position;

initializing a brake constant;

waiting a predetermined delay time and checking to see if a second off-home motor position is detected;

decrementing the brake constant if the second off-home motor position is not detected after said predetermined delay time and for each subsequent predetermined delay time for which the second off-home motor position is not detected;

computing a brake time from the brake constant;

detecting a second home motor position; and applying a brake signal for the brake time subsequent to detecting the second home motor position.

* * * * *

UNITED STATES PATENT AND TRADEMARK OFFICE
CERTIFICATE OF CORRECTION

PATENT NO. : 4,775,824

DATED : October 4, 1988

INVENTOR(S) : Barnes et al.

It is certified that error appears in the above—identified patent and that said Letters Patent is hereby corrected as shown below:

In the Title:

Delete "HANDING" following "BANKNOTE", and insert --HANDLING--.

In the Abstract:

Line 1, delete "cntrol" following "motor" and insert --control--.

Column 1, line 8, delete "916,338" following "No.", and insert --916,388--.

Column 1, line 11. delete "FILD" preceeding "of", and insert --FIELD--.

Column 3, line 39, delete "FIGS." preceeding "12A", and insert --FIG.--.

Column 4, line 4, insert --(-- preceeding "shown".

Column 4, line 51, delete "11B" preceeding "and", and insert --118--.

Column 7, line 20, delete "56" following "fork", and insert --562--.

UNITED STATES PATENT AND TRADEMARK OFFICE

CERTIFICATE OF CORRECTION

PATENT NO. : 4,775,824 Page 2 of 2

DATED : October 4, 1988

INVENTOR(S) : Barnes et al

It is certified that error appears in the above-identified patent and that said Letters Patent is hereby corrected as shown below:

Column 7, line 45, insert --a-- preceeding "signal".

Column 8, line 8, insert --°-- (degree sign) following "x".

Signed and Sealed this

Eighteenth Day of April, 1989

Attest:

DONALD J. QUIGG

*Attesting Officer*

*Commissioner of Patents and Trademarks*